United States Patent [19]

Okazaki et al.

[11] Patent Number: 5,118,492
[45] Date of Patent: Jun. 2, 1992

[54] PROCESS FOR THE CATALYTIC DECOMPOSITION OF CHLOROFLUORO-ALKANES

[75] Inventors: Susumu Okazaki; Akito Kurosaki, both of Mito, Japan

[73] Assignee: Dupont-Mitsui Fluorochemicals Co., Ltd., Tokyo, Japan

[21] Appl. No.: 552,765

[22] Filed: Jul. 16, 1990

[51] Int. Cl.$^5$ ................................ C018 7/00
[52] U.S. Cl. .................... 423/659; 423/481; 423/DIG. 20; 570/227; 570/229
[58] Field of Search ............... 423/481, DIG. 20, 423/659; 208/181, 182, 411; 502/309; 570/227, 229

[56] References Cited

U.S. PATENT DOCUMENTS 3,453,073 7/1990 Sims ................................ 423/481
4,943,671 7/1990 Dockner et al. ................ 423/481

Primary Examiner—Gary P. Straub
Assistant Examiner—Timothy C. Vanoy
Attorney, Agent, or Firm—Webb, Burden, Ziesenheim & Webb

[57] ABSTRACT

A process for the catalytic decomposition of chlorofluoro-alkanes commonly named as "flons" into harmless substances against destructing ozone layer of the stratosphere by using the catalyst comprising iron oxide supported on active carbon at the temperature more than 300° C. in the presence of steam.

4 Claims, 1 Drawing Sheet

RELATION BETWEEN $Fe_2O_3$ CONTENT AND CONVERSION RATE

REACTION TEMPERATURE-CONVERSION RATE CURVE OF VARIOUS FLON COMPONNDS

PROCESS FOR THE CATALYTIC DECOMPOSITION OF CHLOROFLUORO-ALKANES

BACKGROUND OF THE INVENTION

The present invention relates to a process of the catalytic decomposition of chlorofluoro-alkanes commonly named as "flons". More particularly this invention relates to the process of decomposing chlorofluoro-alkanes by using the catalyst to non-hazard compounds in the presence of steam.

Chlorofluoro-alkanes, wherein the hydrogens of hydrocarbon are wholly or partially substituted with fluorine and chlorine, (hereinafter may be abbreviated as flons) are stable both in chemical and thermal properties, non-toxic and has no smell. For that reason, they have been widely used as most safe substances for refrigerant, foaming agent, solvent and so on.

However, recently among these flons, particularly chlorofluorocarbons (CFC), wherein all of the hydrogen atoms are substituted with fluorine and chlorine, have been found to be decomposed in the ozone layer of the stratosphere and to have high possibility of destructing the ozone layer. It has been determined that the production of such flons should be gradually reduced by substituting the one which does not destruct the ozone layer for them.

Accordingly, in addition to the development of such substitute, the development of the process of decomposing the presently used flons into the substances which are no fear of destructing the ozone layer before giving off the flons into air has been desired.

However, such flons are extremely stable compounds, poor in the reactivity and are considered to be difficult to act on the decomposition reaction. Plasma method of decomposition at very high temperature and so on are known, but presently a few of the reports concerning the study of catalytic decomposition reaction have been published.

However, as a method of treating the exhausted gases such a large scaled and high cost method as plasma method is difficult in practical applications so it is almost impossible to really use it for the solution of ozone problem. In order to be easily applicable in the place where they want for users of flons and prevent environmental pollution, the best method is simply to decompose flons by means of catalyst. Accordingly the object of this invention is to provide the decomposing method into harmless substances without hazard of destructing the ozone layer in using or after using flons before giving off into air.

Flons are hydrolyzed and decomposed to form hydrogen chloride, hydrogen fluoride and carbon dioxide gas, and can be collected all as harmless compounds by neutralizing hydrogen chloride and hydrogen fluoride. As the result of our researches to find the catalyst decomposing such flons, we, this inventors, have eventually found that the catalyst comprising iron oxide supported on active carbon can decompose flons extremely effectively and can convert into harmless compounds against ozone destruction and have reached this invention.

SUMMARY OF THE INVENTION

That is to say, the present invention relates to the catalytic decomposition method characterized in contacting chlorofluoro-alkanes (flons) with catalyst comprising active carbon as carrier of iron oxide in the presence of steam at the temperature above 300° C.

DETAILED DESCRIPTION OF THE PREFERRED EMBODIMENTS

Figure 1:
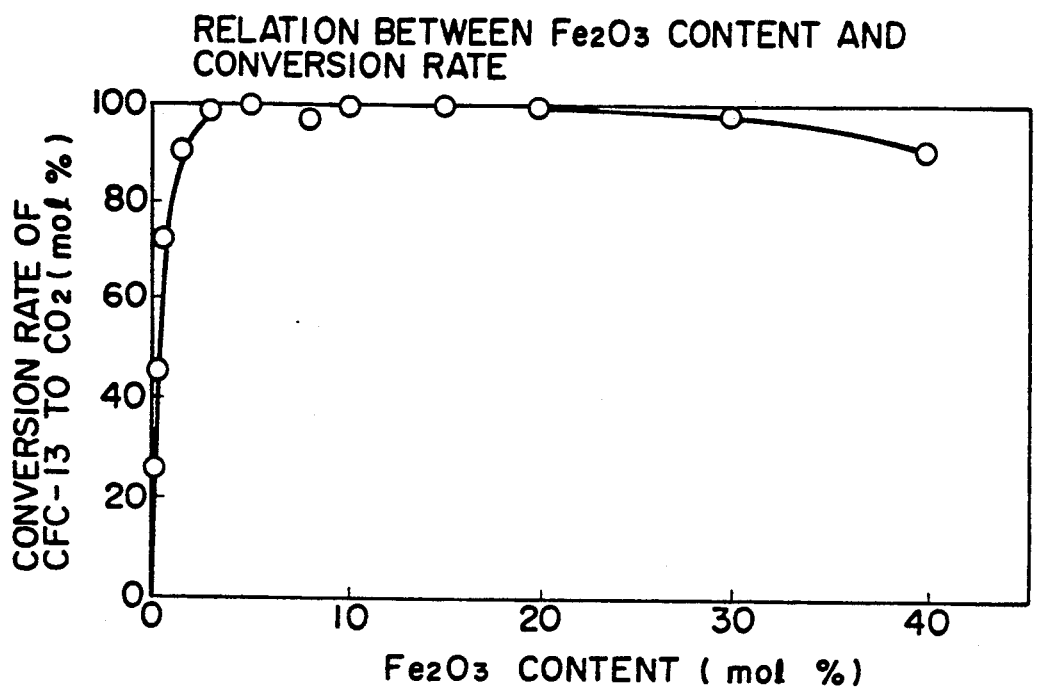
FIG. 1 is the graph showing the relation between the iron oxide content, in the catalyst and $CO_2$ conversion rate when CFC-13 is decomposed according to the method of the present invention.

The application of the catalytic decomposition method of the present invention is not particularly restricted by the kind of flons. This method is applicable to any flons wherein all or a part of the hydrogen in the hydrocarbon are substituted with at least one fluorine and at least one chlorine and is possibly applicable to all flons of methane series and ethane series and so on which are now abundantly produced.

As chlorofluorocarbons wherein all of the hydrogens of the hydrocarbon are substituted with fluorines and chlorines, such chlorofluorocarbons, for examples, chlorofluoromethanes or chlorofluoroethanes such as trichlorofluoroethane (CFC-11), dichlorodifluoromethane (CFC-12), chlorofluoromethane (CFC-13), tetrachlorodifluoroethane (CFC-112), trichlorotriluoroethane (CF-113), dichlorotetrafluoroethane (CFC-114), chloropentafluoroethane (CFC-115) and so on can be described.

And also hydrochloro-fluorocarbons which are comparatively less destructive of the ozone layer are possibly decomposed by the method of this invention. As such kinds of hydrochloro-fluorocarbons, for examples, dichlorofluoromethane (HCFC-21), chlorodifluoromethane (HCFC-22), chlorofluoroethane (HCFC-151), dichlorofluoroethane (HCFC-141), chlorodifluoroethane (HCFC-142), trichlorofluoroethane (HCFC-131), dichlorodifluoroethane (HCFC-132), chlorotrifluoroethane (HCFC-133), tetrachlorofluoroethane (HCFC-121), trichlorofluoroethane (HCFC-122), dichlorotrifluoroethane (HCFC-123), chlorotetrafluoroethane (HCFC-124) and so on can be described.

And also the method of this invention is similarly effective in the flons with 3 or more carbons.

The decomposition catalyst of the flons used in this invention is iron oxide supported on active carbon. Such supported catalyst can be prepared in various methods from various iron compounds as starting materials. For examples, iron compounds such as ferric nitrate, ferric ammonium oxalate, iron ammonium alum and ferric chloride etc, or ferric (III) salt aqueous solution are added with ammonia or alkali aqueous solution. Formed precipitate of ferric hydroxide is absorbed with active carbon, dried and air-oxidized to make iron oxide supported on active carbon. Drying of iron oxide absorbed with above mentioned active carbon may be done by any method, but particularly extremely high catalytic activity is obtained by freeze drying method, so it is the most effective as the preparation of the catalyst of this invention.

Iron oxide supported on active carbon is heat treated in high temperature to obtain supported catalyst for flon decomposition of this invention. The temperature of heat treatment is preferably 300° to 700° C.

The amount of iron oxide to active carbon as carrier is preferably 1 to 40 wt %, particularly preferably 2 to 20 wt %.

The important point of this invention is in the catalyst having iron oxide with active carbon as carrier. Only iron oxide shows no activity to the decomposition reaction of flons and active carbon has by itself almost no catalytic activity. On the contrary, surprisingly the supported catalyst of the present invention shows extremely high catalytic activity.

In this invention, the decomposition-reaction of the flons is carried out at the temperature more than 300° C. and preferably below 600° C. Preferable decomposition-temperature differs in the kinds of flons, generally speaking higher the degree of fluorization, the higher temperature are needed. For examples CFC-12 and CFC-113 start the decomposition from about 300° C. and perfectly decompose at 450° C. On the other hand, CFC-13 starts decomposition from about 400° C. and the temperature of about 800° C. is needed in order to decompose perfectly. Of course, at the temperature below 600° C., by enlarging the contact time with catalyst, raising the decomposition rate is possible. Raising the temperature more than 800° C. can improve the decomposition speed but is not economical from the view-point of the reaction apparatus and necessary energy.

Catalyst can be used either by reaction form of fixed or fluidized layer.

The decomposition reaction is carried out in the presence of steam, flons react with water to form HCl, HF, $CO_2$, CO etc. and furthermore in case of flons with 2 or more carbons to form a little amount of such compounds as $CX_3COX$ (X being fluorine or chlorine). Although mixing ratio of flons to water is not particularly limited, addition of steam more than stoichiometric water amount necessary for decomposition reaction is preferable.

As described above, there are acid compounds such as HCl, HF etc. in the decomposition product. They can be absorbed and neutralized by alkali such as calcium dihydroxide, sodium hydroxide etc.

According to the decomposition method of this invention, flons can perfectly be decomposed by introducing flons-containing gases with steam in a simple reactor at not so high temperature. Consequently, by giving off the exhausted gases from the factory using flons and flon gases in used-off cooler or refrigerator through the apparatus packed with the catalyst of this invention, emission of the flons into air can be prevented.

According to the present invention, flons can be decomposed into harmless substances against destructing ozone in high efficiency by reacting flons and steam by simple apparatus and the exhaust of flons from the used place such as factory can be prevented. Therefore, this invention is effective for the prevention of environmental destruction.

EXAMPLES

This invention will be more clearly understood with reference to the following examples:

EXAMPLES 1 AND 2 AND COMPARATIVE EXAMPLES 1 AND 2

Active carbon is dipped with an aqueous solution of ferric nitrate [$Fe(NO_3)_3.9H_2O$], absorbed with iron salt and air-oxidized in the ordinary method after drying. Drying is carried out by two way method of the ordinary method and freeze-drying method. Thus obtained ferric oxide catalyst supported on active carbon is calcined for 1 hour at 600° C. in nitrogen atmosphere and the supported catalyst containing 3 wt % of iron oxide is prepared.

Mixed gases of CFC-13, nitrogen and steam (gas partial pressure: flons 0.08 atm, steam 0.44 atm and nitrogen 0.50 atm) are introduced through flow-reactors having fixed catalyst layers packed each with 0.65 g of total 4 kinds of catalyst including the above-mentioned 2 kinds of the supported catalyst, iron-oxide catalyst with no active carbon as carrier and the same only active carbon as used in the supported catalyst for 24.3 g.hr.mol$^{-1}$ of the catalyst contact time [total amount of the catalyst/the flow rate of the flons gases (W/F)] and are decomposition reacted at 570° C. Decomposition rate of CFC-13 after the determined time passed are shown in Table 1.

The catalyst of this invention having iron oxide supported on active carbon shows high activity and particularly the catalyst treated by freeze-drying shows extremely high activity.

On the other hand, as shown in the Comparative Examples 1 and 2, the catalyst made of iron oxide alone shows no decomposition activity of CFC-13 at all and the catalyst made of active carbon alone shows extremely low decomposition rate.

EXAMPLE 3

Using the same apparatus as shown in Example 1, decomposition reaction of CFC-13 is carried out under the same condition as Example 1 varying the amount of iron oxide supported on active carbon and the decomposition activity is studied. The result is shown in FIG. 1.

The higher the amount of iron oxide supported on active carbon, the decomposition activity is more improved and at the amount of iron oxide of 3% with active carbon as carrier, the decomposition rate of CFC-13 reaches 100%. When the amount exceeds 20% the activity goes down gradually.

EXAMPLES 4 AND 5

As iron compounds of raw materials, iron ammonium alum [$Fe_2(SO_4)_3(NH_4)_2SO_4 24H_2O$] and ferric chloride ($FeCl_3$) aqueous solution is used, the iron compounds are absorbed with active carbon similarly as in Example 1, dried and sintered to prepare ferric oxide supported on active carbon.

The decomposition reaction of CFC-13 is carried out under the same condition as Example 1 using the same apparatus as in Example 1 with the obtained supported catalyst and the decomposition activity is studied. The result is shown in Table 1.

Ferric oxide catalyst supported on active carbon prepared in the various methods shows high activity respectively.

EXAMPLE 6

Figure 2:
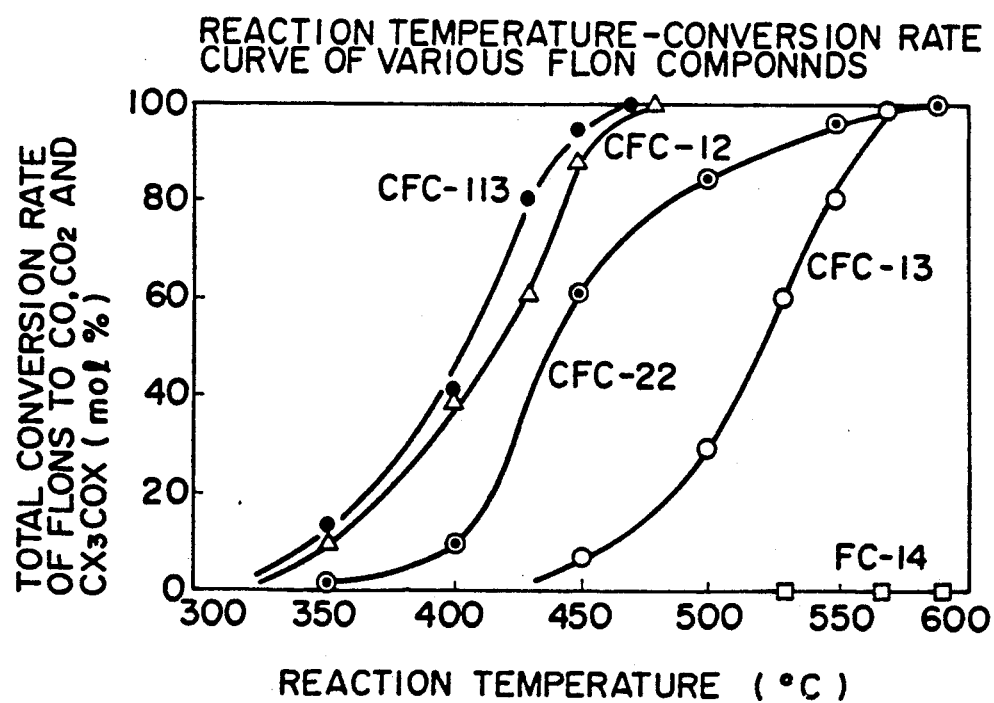
FIG. 2 is the graph showing the relation of the various flon compounds between the reaction temperature and total conversion rate.

The decomposition activity and the temperature dependence are studied using CFC-12, CFC-13, CFC-113 and CFC-22 as flons, and FC-14 as fluoroalkane for Comparative Example under the same condition except reaction temperature as in Example 1. The results are shown in FIG. 2.

CFC-12 and CFC-113 started decomposition nearly at 300° C., and were decomposed perfectly at about 450° C. On the contrary, CFC-13, fluoridization degree of which is higher than that of CFC-12, started decomposition at over 400° C. and was decomposed perfectly at about 570° C.

On the other hand, FC-14 of fluoroalkane did not show decomposition activity even at high temperature over 550° C. Thus, this invention shows high decomposition effectivity particularly against flons which is the most serious problem of destructing ozone layer.

TABLE 1

Decomposition rate of $CCIF_3$ (CFC-13)

| | Catalyst | | | |
|---|---|---|---|---|
| | | Iron compounds as raw materials | Conversion rate to $CO_2$ mol % | |
| | Composition | | After 15 min. | After 60 min. |
| Example 1 | $Fe_2O_3$/active carbon ($Fe_2O_3$ 3 wt %) | Ferric nitrate | 72.9 | 71.6 |
| Example 2 | Same as above. (Treated by freeze-drying) | Same as above | 99.5 | 96.7 |
| Comparative Example 1 | $Fe_2O_3$ only | Same as above | 0 | — |
| Comparative Example 2 | Active carbon only | | 2.2 | 2.0 |
| Example 4 | $Fe_2O_3$/active carbon ($Fe_2O_3$ 3 wt %) | Iron ammonium alum | 97.8 | 98.1 |

TABLE 1-continued

Decomposition rate of $CCIF_3$ (CFC-13)

| | Catalyst | | | |
|---|---|---|---|---|
| | | Iron compounds as raw materials | Conversion rate to $CO_2$ mol % | |
| | Composition | | After 15 min. | After 60 min. |
| Example 5 | Same as above. ($Fe_2O_3$ 3 wt %) | Ferric chloride | 98.5 | — |

Catalyst calcination condition: 600° C. (in nitrogen)
Reaction condition:
(1) Reaction temperature 570° C.
(2) Catalyst contact time (Total catalyst amount/fl on gas flow rate) W/F = 24.3 g · hr/mol
(3) Gas partial pressure fl on 0.06 atm $H_2O$ 0.44 atm

We claim:

1. A process for the complete catalytic decomposition of chlorofluoro-alkanes with formation of a gaseous mixture comprising hydrogen chloride, hydrogen fluoride and carbon dioxide which consists essentially of the steps of reacting chlorofluoro-alkanes and at least a stoichiometric amount of steam over a catalyst consisting essentially of iron oxide supported on active carbon at the temperature more than 300° C., wherein the amount of iron oxide to active carbon in the catalyst is 1 to 40 percent by weight.

2. A process according to claim 1, wherein said chlorofluoro-alkanes are chlorofluorocarbons, wherein all of the hydrogens in hydrocarbons are substituted with at least one fluorine and at least one chlorine.

3. A process according to claim 2, wherein said chlorofluorocarbons are chlorofluoromethanes or chlorofluoroethanes.

4. A process according to claim 1, wherein said catalytic decomposition is carried out at the temperature of 300° C. to 700° C.

* * * * *